US007742154B2

(12) United States Patent
Ehrich et al.

(10) Patent No.: US 7,742,154 B2
(45) Date of Patent: Jun. 22, 2010

(54) METHOD AND DEVICE FOR TESTING VALUABLE DOCUMENTS

(75) Inventors: Sven Ehrich, Reichertshausen (DE); Bernd Wunderer, München (DE)

(73) Assignee: Giesecke & Devrient GmbH, Munich (DE)

( * ) Notice: Subject to any disclaimer, the term of this patent is extended or adjusted under 35 U.S.C. 154(b) by 203 days.

(21) Appl. No.: 11/991,749

(22) PCT Filed: Sep. 8, 2006

(86) PCT No.: PCT/EP2006/008792

§ 371 (c)(1), (2), (4) Date: Jun. 18, 2008

(87) PCT Pub. No.: WO2007/028640

PCT Pub. Date: Mar. 15, 2007

(65) Prior Publication Data

US 2008/0259316 A1 Oct. 23, 2008

(30) Foreign Application Priority Data

Sep. 9, 2005 (DE) ...................... 10 2005 042 991

(51) Int. Cl.
*G06K 9/74* (2006.01)

(52) U.S. Cl. ........................................................ 356/71

(58) Field of Classification Search .................... 356/71
See application file for complete search history.

(56) References Cited

U.S. PATENT DOCUMENTS 3,938,663 A 2/1976 Carnes et al.
4,172,666 A 10/1979 Clarke
4,482,058 A * 11/1984 Steiner ........................ 209/534
4,524,276 A 6/1985 Ohtombe
4,547,896 A 10/1985 Ohtombe et al.
4,623,975 A 11/1986 Kagami
4,922,109 A * 5/1990 Bercovitz et al. ........... 250/556
5,224,176 A 6/1993 Crain
5,280,333 A 1/1994 Wunderer (Continued)

FOREIGN PATENT DOCUMENTS

DE 27 49 873 A1 6/1978

(Continued)

OTHER PUBLICATIONS

Search Report of German Patent Office regarding German Patent Application No. 10 2005 042 991.2 (Mar. 13, 2006) 4 pgs.

*Primary Examiner*—Roy Punnoose
(74) *Attorney, Agent, or Firm*—Bacon & Thomas, PLLC

(57) ABSTRACT

In an apparatus for testing value documents, such as for example bank notes, an area of the bank note is captured from different directions with the help of two optical sensors aligned symmetrically to each other. The measured values supplied by the sensors on the one hand are added up in order to obtain a total measured value which is insensitive to asymmetric effects of the value document, and on the other hand the measured values are subtracted in order to capture exactly these asymmetric effects. In this way with the help of one single apparatus there can be tested authenticity features as well as the quality of the actual state of the value document.

16 Claims, 1 Drawing Sheet

U.S. PATENT DOCUMENTS

| | | | | |
|---|---|---|---|---|
| 5,383,754 | A * | 1/1995 | Sumida et al. | 412/11 |
| 5,615,280 | A * | 3/1997 | Izawa et al. | 382/135 |
| 5,926,392 | A * | 7/1999 | York et al. | 700/223 |
| 6,161,869 | A | 12/2000 | Mowry, Jr. | |
| 6,819,409 | B1 * | 11/2004 | Tompkin et al. | 356/71 |
| 6,937,322 | B2 | 8/2005 | Gerz et al. | |
| 2004/0051862 | A1 | 3/2004 | Alcock et al. | |

FOREIGN PATENT DOCUMENTS

| | | | |
|---|---|---|---|
| DE | 38 15 375 | A1 | 10/1989 |
| DE | 40 22 020 | A1 | 1/1992 |
| DE | 199 24 750 | A1 | 10/2000 |
| DE | 100 07 887 | A1 | 8/2001 |
| EP | 0 092 691 | A2 | 11/1983 |
| GB | 1 470 737 | | 4/1977 |
| WO | WO 2004/053441 | A1 | 6/2004 |

* cited by examiner

METHOD AND DEVICE FOR TESTING VALUABLE DOCUMENTS

BACKGROUND OF THE INVENTION

A. Field

The present invention relates to a method and an apparatus for testing value documents, in particular bank notes, in order to determine value document properties.

B. Related Art

Value documents within the terms of the present invention in particular are bank notes, but also other documents and deeds requiring protection such as for example checks, share certificates, ID cards, passports, admission tickets, public transport tickets and the like.

Characteristic properties of these value documents are checked for determining their authenticity. For this purpose most different sensors adapted to the particular properties to be checked are used. With the help of optical sensors, for example, the absorption, transmission and/or luminescence properties of value documents can be tested.

Due to the daily use some types of value documents may show signs of wear. This in particular is the case with bank notes, which in the course of time crumple and the surfaces of which soil. Both signs of wear lead to an asymmetric reflection behavior. In order to being able to reliably test such value documents with the help of optical sensors, the value document area to be tested is illuminated simultaneously from various directions. In this way the optical sensors are insensitive to the above-mentioned asymmetric effects.

But value documents are not only tested as to their authenticity, they are also checked as to their fitness for circulation. Therefore, additional sensors are used in order to check exactly those properties that mainly have asymmetric effects in their reflection behavior, which because of the special illumination are not detectable with the help of the above-mentioned optical sensors, i.e. in particular, for example, crumples and soiling.

The problem of the present invention is to propose a simplified method and a simplified apparatus for testing value documents, in order to capture value document properties independently of asymmetric effects of the value document as well as the asymmetric effects of the value document.

This problem is solved by a method and an apparatus having the features of the independent patent claims. In claims dependent thereon advantageous developments and embodiments of the invention are specified.

SUMMARY OF THE INVENTION

According to the invention the value document area to be tested is captured from different directions with the help of two (or more) sensors, the value document properties to be tested, i.e. in particular authenticity features, being determined unaffected by asymmetric effects of the value document by adding up the measured values of the two sensors, whereas the asymmetric effects, such as for example crumples and asymmetric reflections, are determined by a subtraction of the measured values supplied by the sensors. Thus, substantial for the invention is an evaluation of the measured values by both adding up and subtraction.

The measured values supplied by the sensors on the one hand are added up in order to obtain a total measured value, which is insensitive to asymmetric effects of the value document. Additionally, the measured values are subtracted in order to capture exactly these asymmetric effects. In this way with the help of one single apparatus there can be tested the authenticity features and other value-document-specific features as well as the quality of the actual state of the value document which is deduced exactly from asymmetric effects.

The sensors each comprise an illumination device for irradiating the value document area to be tested and a detector for measuring the value document radiation in the irradiated value document area. Depending on whether the reflection, transmission or emission behavior of the value document is to be checked, the detectors in relation to the document of value are disposed on the same side as the illumination devices or on the opposite side of the value document.

Preferably, either the detectors or the illumination devices of the sensors are combined to form one joint detector or to form one joint illumination device. This is especially expedient, when the two sensors in relation to the value document area to be checked are arranged symmetrically. With that the constructive efforts for the sensor device can be clearly reduced.

It is advantageous, for example, to irradiate the bank note with two illumination devices from various irradiation directions and to provide a joint detector for example in a central position between these illumination devices. In order to being able to also determine differences in radiation on the basis of the measured values supplied by the joint detector, it is expedient to alternately activate the two illumination devices in an appropriate fashion. Then at appropriate points of time the evaluation device connected with the illumination devices receives measured radiation values captured by the detector, which are to be put down either to the one or to the other of the two illumination devices. The two measured radiation values then can be added up as well as be used for subtraction. When the difference is nearly zero, this means that the document of value is more or less new.

But the problem with the above-mentioned embodiment is the control effort for alternately activating the two illumination devices. Moreover, the value document areas irradiated by the two illumination devices do not match exactly, when the value documents, as it is common usage with bank note checks, are guided past the checking apparatus in a continuous and not in an intermittent fashion.

Therefore, a further preferred embodiment of the invention provides that the two (or more) sensors use one joint illumination device instead of one joint detector. In this case i.e. that the illumination device for example is disposed centrally between two detectors which preferably are aligned symmetrically in relation to the value document area to be checked. Unlike the case where the illumination is effected with the help of two illumination devices (and joint detector), for capturing the measuring values with the help of two detectors (and joint illumination device) it is not necessary to operate the detectors alternately. It is sufficient, when in the evaluation device the measured values supplied by the detectors on the one hand are added up and on the other hand are used for subtraction. The additional technical effort thus can be limited to a software to be adapted. Moreover, the above mentioned difference caused by the transport of the value document to be checked does not occur.

In order to being able to capture the value documents, in particular bank notes, over their entire transport width, preferably detector arrays, in particular linearly disposed detector arrays, are used. The irradiation of the bank note, for example, can also be effected with the help of LED arrays, in particular linearly disposed LED arrays.

BRIEF DESCRIPTION OF THE DRAWINGS

In the following the invention is described by way of example with reference to the accompanying figures.

DETAILED DESCRIPTION OF PREFERRED EMBODIMENTS OF THE INVENTION

Figure 1:
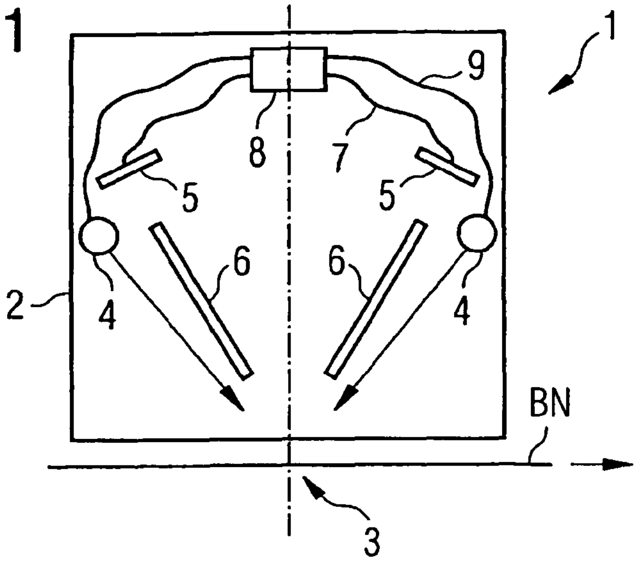
FIG. 1 schematically shows an apparatus according to the invention for testing value documents with the help of two separate sensors.

FIG. 1 shows a first embodiment of an apparatus 1 for testing value documents, in particular bank notes BN. In a housing 2 two sensors are directed to a measuring zone 3, which corresponds to a value document area to be captured of the bank note BN. Bank note BN is transported (in the direction of the arrow) past apparatus 1, so that various value document areas are tested successively.

The two sensors each comprise an illumination device 4, a detector 5 and a Selfoc lens 6 disposed between detector 5 and measuring zone 3. Detectors 5 are connected via lines 7 to an evaluation device 8. Illumination devices 4, too, are connected via lines 9 to evaluation device 8. The radiation directions of the illumination devices 4 each are shown by an arrow starting at the radiation devices 4 and directing to the measuring zone 3.

When bank note BN is transported past apparatus 1, it is alternately irradiated by the one and the other illumination device 4 in the measuring zone 3. Via connecting lines 9 the respective radiation periods are communicated to evaluation device 8, or the illumination devices 4 are controlled accordingly by the evaluation device 8 via these lines 9. The periods can overlap, if there are time frames, in which only the one and only the other of the two illumination devices 4 is active. With the help of the detectors 5 radiation of the value document falling through the Selfoc lens 6 is captured, and the captured measured radiation values are transmitted via lines 7 to evaluation device 8. Here each of the two illumination devices 4 is firmly assigned to one of the two detectors 5, in such a way that only such measured radiation values supplied by a detector 5 are used for evaluation which were captured during the time period in which only that illumination device 4 was active which is assigned to this detector. The measured radiation values for a measuring point captured by the detectors 5 then on the one hand are added up to form a first measuring value and on the other hand a second measuring value is obtained by subtraction. With the help of the first measuring value the features characterizing the bank note, e.g. authenticity features, currency and denomination features etc, can be checked, in order to deduce statements about authenticity and type (currency, denomination) of the bank note. With the help of the second measuring value the asymmetric properties, e.g. crumples, can be checked, in order to deduce a statement about the state of the bank note.

Figure 2:
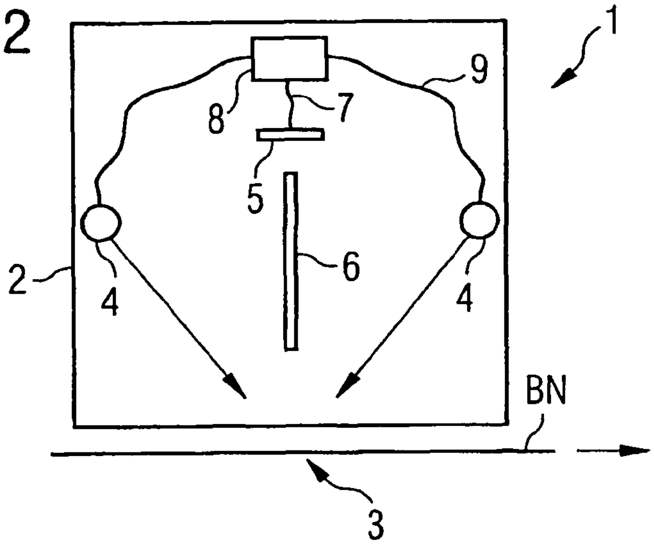
FIG. 2 shows the apparatus of FIG. 1, the two sensors sharing a detector.

The apparatus shown in FIG. 2 differs from the apparatus, according to FIG. 1 only in that the two sensors share one detector 5 having an upstream Selfoc lens 6. As for the rest, structure and mode of operation are identical. This means, evaluation device 8 via the joint detector 5 alternately receives measured radiation values, which are to be put down to the irradiation of the bank note BN with the help of the one or the other of the two illumination devices 4. Due to the connection of the evaluation device 8 with the illumination devices 4 via the connecting lines 9, synchronizing the measured radiation values supplied by detector 5 with the respective illumination periods of the illumination devices 4 is ensured.

Figure 3:
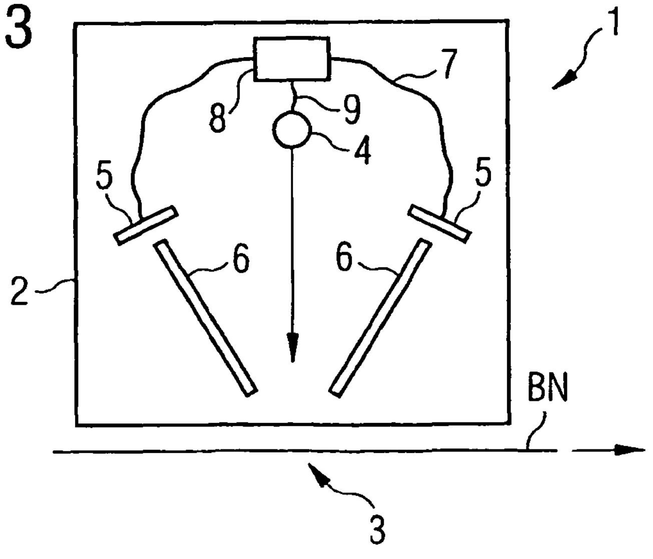
FIG. 3 shows the apparatus of FIG. 1, the two sensors sharing an illumination device.

The apparatus shown in FIG. 3 differs from the apparatus according to FIG. 1 in that the two sensors share one illumination device 4. This embodiment, optionally, can do without connecting line 9 between evaluation device 8 and illumination device 4, since illumination device 4 has not to be controlled by evaluation device 8. Instead, illumination device 4 can be continuously switched-on or, for example, can be activated by a light barrier, when bank note BN reaches the measuring zone 3. Then via lines 7 the evaluation device 8 receives the measured radiation values captured by the two detectors 5 and carries out an addition as well as a subtraction, in order to being able to conclude, on the basis of the results received thereby, for example, the authenticity and the state of the value document.

The invention claimed is:

1. A method for testing value documents, comprising the steps:

irradiating the value document at least in an area of the value document from a first irradiation direction and measuring value document radiation in the value document area from a first detection direction, irradiating the value document area from a second irradiation direction differing from at least one of the first irradiation direction and measuring value document radiation in the value document area from a second detection direction differing from the first detection direction, forming a first measuring value from the measured radiations by adding up the measured radiation values, forming a second measuring value from the measured radiations by subtracting the measured radiation values, deducing a statement about features of the value document, which relate to at least one of the authenticity and type of the value document, with the help of the first measuring value, and deducing a statement about features of the value document, which relate to the state of the value document, with the help of the second measuring value.

2. The method according to claim 1, wherein the first and the second irradiation direction are different and the first and the second detection direction are identical, the step of measuring the value document radiation from the identical detection direction being effected with the help of the same detector.

3. The method according to claim 1, wherein irradiating the value document area is effected alternately from the first and the second irradiation direction.

4. The method according to claim 1, wherein the first and the second irradiation direction are identical and the first and the second detection direction are different, the step of irradiating the value document area from the identical irradiation direction being effected with the help of the same illumination device.

5. The method according to claim 1, wherein the document of value is transported, in a manner to successively test various value document areas.

6. The method according to claim 1, wherein at least one of the first and the second irradiation direction and the first and the second detection direction are arranged symmetrically in relation to the value document area.

7. Apparatus for testing value documents, comprising:

a measuring zone, and a sensor device for measuring value document properties, comprising at least two optical sensors directed to the measuring zone from different directions and each having at least one illumination device and each having at least one detector, wherein the sensors jointly may have assigned thereto the at least one illumination device or the at least one detector, an evaluation device arranged to derive a first measuring value from the signals of the at least two sensors by adding up and a second measuring value by subtracting, wherein the evaluation device evaluates the first measuring value in order to deduce a statement about features of the value document which relate to at least one of authenticity and type of the value document, and wherein the evaluation device evaluates the second measuring value in order to deduce a statement about features of the value document which relate to the state of the value document.

8. The apparatus according to claim 7, wherein the sensors jointly have assigned thereto the at least one detector.

9. The apparatus according to claim 7, including a control device arranged to enable alternate actuation of the illumination devices of the sensors.

10. The apparatus according to claim 7, wherein the sensors jointly have assigned thereto the at least one illumination device.

11. The apparatus according to claim 7, including a transport system for transporting the value documents through the measuring zone.

12. The apparatus according to claim 7, wherein the at least one detector is a detector array.

13. The apparatus according to claim 7, wherein the at least one illumination device is an LED array.

14. The apparatus according to claim 7, including at least one Selfoc lens between the measuring zone and the at least one detector.

15. The apparatus according to claim 7, wherein in relation to measuring zone the sensors are aligned symmetrically to each other.

16. A bank note processing machine, comprising an apparatus for testing bank notes according to claim 7.

* * * * *